ABSTRACT

United States Patent

[11] 3,556,085

| [72] | Inventor | Nagashige Takahashi |
| --- | --- | --- |
| | | Tokyo, Japan |
| [21] | Appl. No. | 708,242 |
| [22] | Filed | Feb. 26, 1968 |
| [45] | Patented | Jan. 19, 1971 |
| [73] | Assignee | Olympus Optical Company, Ltd. |
| | | Tokyo, Japan |

[54] OPTICAL VIEWING INSTRUMENT
13 Claims, 6 Drawing Figs.

[52] U.S. Cl. ..................................................... 128/6,
350/396
[51] Int. Cl. ....................................................... A61b 1/06,
G02b 5/14
[50] Field of Search.......................................... 128/4,
395—398; 350/96, (Inquired); 128/6, 7

[56] References Cited
UNITED STATES PATENTS

| 1,001,787 | 8/1911 | Wappler........................ | 128/4 |
| 3,187,627 | 6/1965 | Kapany ......................... | 350/96 |
| 3,417,745 | 12/1968 | Sheldon......................... | 128/6 |
| 3,434,775 | 3/1969 | Gosselin ....................... | 128/6 |

*Primary Examiner*—Richard A. Gaudet
*Assistant Examiner*—J. B. Mitchell
*Attorney*—Kurt Kelman ABSTRACT: Microscope adapted to be inserted into the spaces in a living body for direct examination of the interior surfaces thereof and having a magnifying objective lens system, a fiber optical viewing system, eyepiece means for observing the magnified image formed on the rear end surface of said fiber optical viewing system by transmitting the image of the object focused on the forward end surface of said fiber optical viewing system transmitting at high degree of magnification by means of said objective lens system through said fiber optical viewing system to the rear end surface thereof, and fiber optical illuminating system, wherein an optical means having inclined forward end surface is located in front of said magnifying objective lens system so that the optical means easily penetrates into the part to be examined by the microscope, the image of the object contacting the inclined forward end surface of said optical means being focused by means of said objective lens system on the forward end surface of said fiber optical viewing system at high degree of magnification.

INVENTOR.
NAGASHIGE TAKAHASHI

BY Kurt Kelman
AGENT

OPTICAL VIEWING INSTRUMENT

Optical viewing instrument adapted to be inserted into the spaces in a living body for direct examination of the interior surfaces thereof and comprising objective lens system, fiber optical viewing system, eyepiece means, and fiber optical illuminating system, wherein a microscope is detachably inserted through a guide hole provided in said optical viewing instrument so that the tip of the microscope projects from the forward end of the optical viewing instrument, said microscope comprising optical means having the inclined forward end surface, magnifying objective lens system, fiber optical viewing system, and eyepiece means, said optical means easily penetrating into the part to be examined by the microscope after that part to be examined has been found out by using the optical system of said optical viewing instrument.

BACKGROUND OF THE INVENTION

Heretofore, diagnostic inspection or observation of the tissue or the cells of the living body has been carried out by excising a specimen from the internal organ of the living body for examination with a microscope of the conventional type.

However, such a procedure is very time consuming and troublesome. Further, doctors, pathologists, scientists, and others have long desired to inspect or observe tissue or cells in the internal organ of the living body directly, without the necessity of excising a specimen from the portion to be inspected and thereby to discover diseases such as ulcer or cancer at an earlier stage so countermeasures will be more effective.

The present invention, therefore, relates to a microscope with which it is possible to examine directly the interior surface of spaces within a living body, such as human body, not open to direct examination by sight or touch. More particularly, the present invention is directed to a microscope which is most advantageously used in the examination of internal organs such as the bronchia of the human body and for direct examination under high magnification of cells or tissue in the internal organ damaged by disease (ulcer, cancer, etc.). With the present invention, the end surface of the objective lens system of the microscope is inserted into that part of the interior surface in the living body where there is suspicion of disease, and there is no need to excise a specimen from the internal organ for microscopic examination.

The present invention further relates to an optical viewing instrument for direct examination of interior surface of spaces within a living body in which a microscope having a fiber optical system adapted to penetrate directly into the internal organ of the living body is detachably assembled in the optical viewing instrument thereby permitting diagnostic examination under high magnification of said internal organ to be carried out directly without the excision of cells or tissue from the living body. In use, the procedure is to make a general survey of the internal organ by inserting the optical viewing instrument and examining by means of the objective lens system and fiber optical viewing system incorporated in the optical viewing instrument; then the microscope with fiber optical system is used for examination under a high degree of magnification. Also, if desired, specimen gathering means such as forceps and the like can be used in place of the microscope by removing the microscope from the optical viewing instrument and replacing with the specimen gathering means.

SUMMARY OF THE INVENTION

One object of the present invention is, therefore, to provide a novel and useful microscope which does not require excising a specimen as is necessary with the prior art microscope and with which diagnostic examination of the internal organ of the living body can be directly carried out by inserting the forward end surface of the microscope into the internal organ of the living body.

Another object of the present invention is to provide a novel and useful optical viewing instrument which can avoid the disadvantage of the prior art previously mentioned and which incorporates a removable microscope having a magnifying optical system. The end surface of said viewing instrument is insertable together with said microscope incorporated therein into the internal organ of the living body where the diagnostic examination is to be carried out. The end surface of said optical system penetrates that part of the internal organ to be examined so that examination under high magnification can be directly carried out without the necessity of excising a specimen from the internal organ for examination with a conventional microscope. Further, if desired, the microscope can be removed from said viewing instrument and specimen gathering means such as forceps can be inserted in place of said microscope for picking specimens out of the internal organ.

One feature of the present invention is a microscope which comprises a fiber optical system of very small diameter. The tip of said microscope fiber optical system is inclined with respect to the plane normal to the optical axis of the fiber optical system so that it forms a sharp point. A magnifying objective lens system is located behind said fiber optical system in optical alignment therewith at an appropriate distance from the rear end surface thereof, and a fiber optical viewing system is located behind said magnifying objective lens system in optical alignment therewith with the front end surface of said fiber optical viewing system being an appropriate distance from said magnifying objective lens system. An eyepiece means is located behind the rear end surface of said fiber optical viewing system in optical alignment therewith, and a fiber optical illuminating system extends along said first mentioned fiber optical system, magnifying objective lens system and the entirety or a portion of said fiber optical viewing system for transmitting light from a light source connected thereto through the fiber optical illuminating system to the tip thereof so that the object to be inspected is illuminated. A pipe surrounds said first mentioned fiber optical system, said magnifying objective lens system, the front end portion of said fiber optical viewing system and the portion of said fiber optical illuminating system extending along the above mentioned elements so that the tip of said first mentioned fiber optical system can be properly inserted into that part of the internal organ to be directly inspected when the microscope is used; the remaining portions of the above mentioned elements are covered by a rigid or flexible sheath for protection of the elements to be inserted into the internal organ, the image of the object contacting the tip of said first mentioned fiber optical system being transmitted therethrough to the rear end surface thereof, the image on the rear end surface of the first mentioned fiber optical system being focused by said magnifying objective lens system onto the front end surface of said fiber optical viewing system at a high degree of magnification so that the magnified image thus focused on the front end surface of the fiber optical viewing system is transmitted therethrough to the rear end surface of the fiber optical viewing system. The image transmitted to the rear end surface of the fiber optical viewing system is further magnified by the eyepiece means for observation of the image of the object at a high degree of magnification.

Another feature of the present invention is that the above mentioned fiber optical system coming to a point may be replaced by a parallel plane optical element which is located in inclined relationship with respect to the plane normal to the optical axis of the magnifying objective lens system so that part of the edge can easily penetrate the internal organ to be examined. The front end surface of the fiber optical viewing system is inclined with respect to the plane normal to the optical axis of the magnifying objective lens system so that said parallel plane optical element and the front end surface of the fiber optical viewing system are in optically conjugate relationship with each other thereby permitting the sharp image of the object to be focused on the front end surface of the fiber optical viewing system although evenness of the magnification of the image is impaired to some extent. Alternatively, the front end surface of the fiber optical viewing system may be inclined in parallel relationship to the parallel plane optical element so that a perspective view of the image is obtained—that is, the image of that part of the object remote from the objective lens system appears smaller in comparison with the image of that part of the object nearer the objective lens system.

In observing the object in accordance with the present invention, the forward end surface of the fiber optical system or the parallel plane optical element constituting the penetrating edge is in the form of ellipse since the end surface is inclined at an angle with respect to the plane normal to the optical axis of the optical system, and the object to be examined is in contact with this elliptical surface and the object bounded by such an ellipse is viewed through the fiber optical viewing system as having a circular cross-sectional configuration. Therefore, the magnification of the image in the direction of the major axis of the ellipse forming the boundary of the object is less that that in the direction of the minor axis of the ellipse. In accordance with a further feature of the present invention a cylindrical lens system or anamorphic lens system may be incorporated in the objective lens system so that magnification of the image in both the major and the minor axes of the ellipse will be equal.

In accordance with another feature of the present invention, the microscope is not provided with a fiber optical illuminating system but is detachably inserted through the optical viewing instrument having a housing to which an eyepiece means and an outer tube are attached so that the tip of the microscope projects from the front end of the outer tube of the instrument for examination of the object under a high degree of magnification. An objective lens system is mounted in the front end of the outer tube and a fiber optical viewing system extends through the outer tube with the front end surface thereof located at an appropriate distance rearwardly from said objective lens system in optical alignment therewith the image of the object being focused by said objective lens system onto the front end surface of the fiber optical viewing system, the image being transmitted through the fiber optical viewing system to the rear end surface thereof so that the thus transmitted image can be observed by the eyepiece means mounted on the housing. The fiber optical illuminating system extends through the outer tube to the front end thereof, the light from a light source connected to the fiber optical illuminating system being transmitted therethrough to the front end thereof for illumination of the object to be observed by the objective lens system. In practice, the part to be examined under high degree of magnification through the microscope is selected by first using the optical system of the optical viewing instrument having lower degree of magnification. Then, the microscope is manipulated from the housing so that the end surface thereof penetrates that part of the internal organ which has been selected for examination. The fiber optical viewing system of the optical viewing instrument can also be used for illuminating the object by connecting the fiber optical viewing system to a light source by removing the eyepiece means when the microscope is used, so that the intensity of the illumination of the object is greatly enhanced. A dyeing or coloring agent can be supplied through a pipe extending through the outer tube from the housing so that clear observation of the object can be effected by dyeing or coloring the object.

DETAILED DESCRIPTION OF THE PREFERRED EMBODIMENTS

Figure 1:
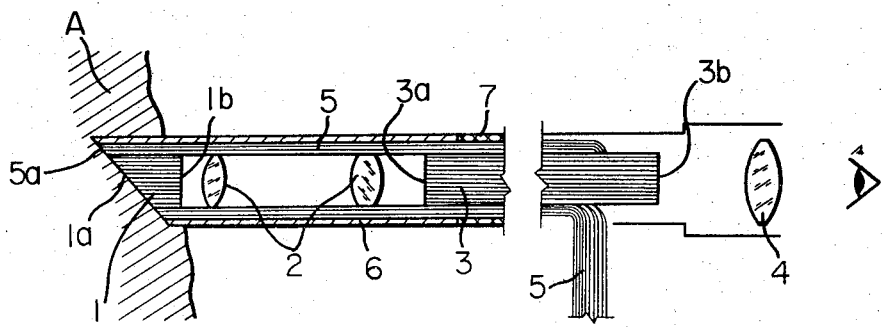
FIG. 1 is a diagrammatic longitudinal sectional view showing the first embodiment of the microscope in accordance with the present invention as it is used for the examination of an internal organ of a living body.

Referring to FIG. 1, the first embodiment of the microscope constructed in accordance with the present invention comprises a fiber optical system 1. End surface 1a of said fiber optical system 1 is inclined with respect to the plane normal to the longitudinal axis of fiber optical system 1 as shown so that the end surface of said fiber optical system 1 can easily penetrate any portion of an internal organ of the living body for direct examination thereof. When said end surface has penetrated the internal organ, the end surface 1a of said fiber optical system 1 is brought into close contact with the tissue or cells to be examined thereby transmitting the image formed on end surface 1a through said fiber optical system 1 to the rear end surface 1b thereof. Magnifying objective lens system 2 comprised of one or more lens elements or groups of lens elements is located axially of said fiber optical system 1 behind rear end surface 1b of fiber optical system 1 at an appropriate distance therefrom so as to focus the highly magnified image on said rear end surface 1b of fiber optical system 1 onto front end surface 3a of fiber optical viewing system 3 which is located an appropriate distance axially rearwardly of said magnifying objective lens system 2. The highly magnified image focused on said front end surface 3a of fiber optical viewing system 3 is transmitted therethrough to rear end surface 3b of said fiber optical viewing system 3 thereby permitting the highly magnified image formed on said rear end surface 3b of fiber optical viewing system 3 to be viewed on a higher scale of magnification through eyepiece means 4 which is adjustably located an appropriate distance axially rearwardly of said rear end surface 3b of fiber optical viewing system 3. Fiber optical illuminating system 5 surrounds the periphery of the forward end surface of said fiber optical system 1 and magnifying objective lens system 2 as well as the entirety or a portion of the length of fiber optical viewing system 3 as shown. A cylindrical parting member dividing fiber optical illuminating system 5 from the elements which are surrounded by said system 5 may be provided so as to locate them in position. Fiber optical illuminating system 5 serves to transmit the light from a light source not shown to forward end surface 5a of illuminating fiber optical system 5 so as to illuminate that part of the internal organ penetrated by end surface 1a for examination under a high degree of magnification. The portion of said fiber optical illuminating system 5 which surrounds said fiber optical system 1, said magnifying objective system 2 and the front end portion of said fiber optical viewing system 3 is covered watertightly by a pointed tube 6 made of a suitable material such as metal, hard synthetic resin, or the like so that said fiber optical system 1, said magnifying objective system 2 and said front end surface 3a of fiber optical viewing system 3 are kept in optical alignment with each other. The remaining portion of said fiber optical illuminating system 5 and the portion of said fiber optical viewing system 3 extending beyond said fiber optical illuminating system 5 are covered by flexible or rigid outer tube 7 which is connected at its one end to the casing to which said eyepiece means 4 is attached in the conventional manner.

The particulars of the microscope constructed in accordance with the present invention as shown in FIG. 1 are as follows:

Magnifying power of the objective system —10 ×
Magnifying power of the eyepiece means —10 ×
Total magnifying power —100 ×
Effective diameter of the fiber optical viewing system —1.5 mm.
Diameter of fibers in the fiber optical systems —5 $\mu$.

The size of the object to be observed which contacts end surface 1a of fiber optical system 1 can be made 0.15 mm. in the direction of the minor axis of the ellipse defining the boundary of said end surface 1a. By using fibers having the diameter of 5 $\mu$ in the fiber optical systems, it was possible to successfully distinguish cells or tissue 10 —40 $\mu$ in size.

In the above embodiment, the image observed by the examiner is in circular from, whereas the object per se in contact with end surface 1a is in the form of an ellipse. It means that the magnification of the image of the object in the direction of the major axis of the ellipse defining the boundary of the object is less that that in the direction of the minor axis of the ellipse. However, it can readily be seen by a person skilled in the art that the uneven magnification of the object can be compensated for to obtain the proper magnification of the object in all directions by incorporating in the magnifying objective lens system a well known means such as cylindrical lens system or anamorphic lens system.

Figure 2:
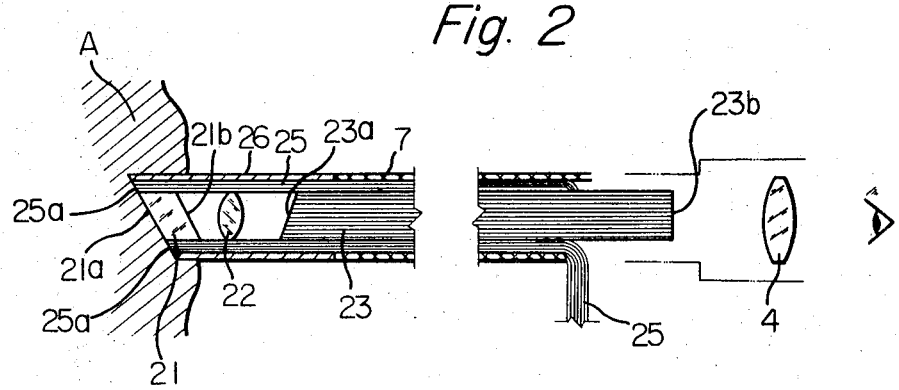
FIG. 2 is a diagrammatic longitudinal sectional view showing the second embodiment of the microscope in accordance with the present invention as it is used for the examination of an internal organ of a living body.

FIG. 2 illustrates a second embodiment of the microscope constructed in accordance with the present invention. This embodiment is similar to that shown in FIG. 1 except that the fiber optical system 1 shown in FIG. 1 is replaced by parallel plane optical element 21 located in inclined relationship with respect to the plane normal to the optical axis of objective lens system 22 corresponding to objective lens system 2 in FIG. 1 and that front end surface 23a of fiber optical viewing system 23 corresponding to front end surface 3a shown in FIG. 1 is inclined with respect to the plane normal to the optical axis of objective lens system 22 so as to give an optically conjugate relationship between said parallel plane optical element 21 and said front end surface 23a of fiber optical viewing system 23. Thus, high resolving power of the image of the object in contact with forward end surface 21a of parallel plane optical element 21 can be obtained, though the perspective effect (uneven magnification of the object) occurs to some extent, which, however, presents no problem in diagnosis. Like the embodiment shown in FIG. 1, the embodiment shown in FIG. 2 is provided with fiber optical illuminating system 25. The light transmitted from a light source not shown through fiber optical illuminating system 25 to forward end surface 25a thereof illuminates portion A of the internal organ of the living body to be examined.

The detailed particulars in designing various elements of this embodiment may be the same as the those set forth in connection with the first embodiment shown in FIG. 1. Thus, by using objective lens system 22 having the magnifying power of 10 ×, eyepiece means 4 also having the magnifying power of 10 × and fiber optical viewing system 23 having the diameter of 1.5 mm., cells or tissue 10 —40 $\mu$ in size can be successfully magnified for examination up to a total magnification of 100 × by selecting fibers 5 $\mu$ in diameter for the fiber optical systems. It is clear to a person skilled in the art that a cylindrical or anamorphic lens system may be incorporated in the embodiment shown in FIG. 2 in the same way as in FIG. 1 so as to reduce the distortion or uneven magnification of the object in the directions of the major and the minor axes of the ellipse defining the boundary of forward end surface 21a of parallel plane optical element 21.

Figure 3:
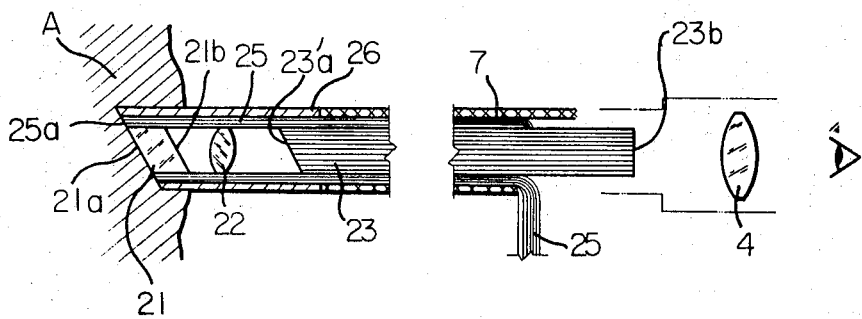
FIG. 3 is a sectional view similar to FIG. 2 but showing a modification of the second embodiment of the microscope shown in FIG. 2.

FIG. 3 shows an alternative embodiment of FIG. 2. This embodiment is substantially similar to the embodiment shown in FIG. 2 except that front end surface 23'a 23aof fiber optical viewing system 23 is located in parallel relationship with respect to rear end surface 21b of parallel plane optical element 21 instead of being located to give an optically conjugate relationship therebetween as shown in FIG. 2. This construction eliminates perspective effect and gives an image in which all parts of the object are equally magnified, those parts remote from the objective lens system and those near the objective lens system, that is, the image focused at the lower side of front end surface 23'a as seen in FIG. 3 has the same magnification as that focused at the upper side of front end surface 23'a although the resolving power of the objective lens system 22 is impaired to some extent.

Figure 4:
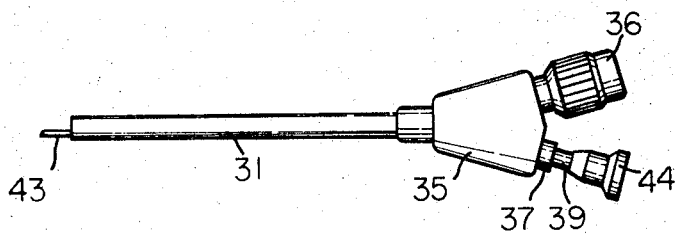
FIG. 4 is a diagrammatic general view of the third embodiment of the present invention in which the microscope in accordance with the present invention is removably incorporated in the optical viewing instrument for the examination by the microscope of an internal organ of a living body in addition to examination by means of the optical system of the optical viewing instrument having lower magnification.
Figure 5:
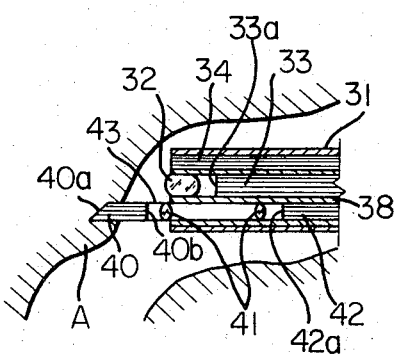
FIG. 5 is a detailed sectional view in enlarged scale showing a portion of the optical viewing instrument illustrated in FIG. 4.
Figure 6:
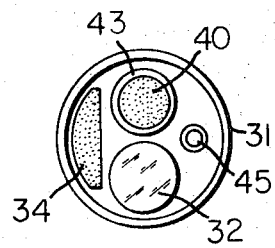
FIG. 6 is a transverse cross-sectional view showing the detailed construction of the portion illustrated in FIG. 5.

FIGS. 4—6 show the third embodiment of the present invention. The optical viewing instrument constructed as shown in FIGS. 4 —6 comprises flexible or rigid outer tube 31, fiber optical illuminating system 34 extending longitudinally in said outer tube 31, fiber optical system 33 also extending longitudinally in said outer tube 31, objective lens system 32 comprised of one or more lens elements or lens groups and located in front of front end surface 33a of said fiber optical system 33 at an appropriate distance therefrom at the forward end of said outer tube 31, The rear end of said outer tube 31 is connected to a housing 35 to which adjustable eyepiece means 36 is secured for observing the image of the object transmitted through said objective lens system 32 and said fiber optical system 33 to the rear end surface thereof (not shown). Said housing 35 is provided with an inlet opening 37, and guide tube 38 connected thereto extends through outer tube 31.

Microscope 39 of the present invention is slidably inserted into said guide tube 38 so that forward end surface 40a of fiber optical system 40 of microscope 39 projects from the forward end of outer tube 31 thereby permitting said forward end surface 40a to be inserted in that part of the internal organ of the living body to be examined under a high degree of magnification by manipulating microscope 39 while the part of the internal organ to be examined is observed by means of eyepiece means 36 of the viewing instrument as set forth hereinafter. The microscope, indicated generally by reference numeral 39, comprises fiber optical system 40 at the forward end thereof with forward end surface 40a inclined with respect to the plane normal to the optical axis of fiber optical system 40, magnifying objective lens system 41 comprised of one or more lens elements or lens groups and located behind said fiber optical system 40 in optical alignment therewith at an appropriate distance therefrom, fiber optical viewing system 42 with front end surface 42a being located behind said objective lens system 41 in optical alignment therewith at an appropriate distance therefrom and adjustable eyepiece means 44 at the rear end of microscope 39, the above mentioned elements being covered by pointed tube 43 and a rigid or flexible outer tube in the same way as in FIG. 1. The microscope in this embodiment is substantially similar to that shown in FIG. 1 except that fiber optical illuminating system is not provided in the microscope shown in FIGS. 4 —6. It will be clear to a person skilled in the art that the fiber optical system 40 shown in FIGS. 4—6 may be replaced by a parallel plane optical element 21 as shown in FIG. 2 or 3 and front end surface 42a of viewing fiber optical system 42 may be inclined with respect to the plane perpendicular to the optical axis of objective lens system 41 so as to obtain the optical performance as described hereinabove in connection with FIG. 2 or 3.

Pipe 45 shown in FIG. 6 extends from housing 35 through outer tube 31 to the front end thereof. Pipe 45 serves to supply dyeing or coloring agent to that part of the internal organ to be examined so as to facilitate the examination of said portion of the internal organ by dyeing or coloring cells or tissue thereof. Fiber optical illuminating system 34 transmits light from a light source not shown through said fiber optical illuminating system 34 to the front end surface thereof so that the portion of the internal organ to be examined is illuminated.

It is clear to a person skilled in the art that a cylindrical or anamorphic lens system can be used in the microscope shown in FIGS. 4—6 to compensate for the distortion or uneven magnification of the object as described hereinabove in connection with FIGS. 1, 2 and 3. The particulars in designing the microscope of FIGS. 4—6 may be made the same as those shown in FIGS. 1—3.

The operation of the embodiment shown in FIGS. 4—6 is as follows.

The optical viewing instrument of FIG. 4, with or without microscope 39 being inserted therein, is inserted into the internal organ of the living body to be examined. That part of the internal organ under examination is illuminated by fiber optical illuminating system 34 so that it can be observed through objective lens system 32, fiber optical viewing system 33 and eyepiece means 36. Microscope 39 may be inserted in the optical viewing instrument after determining which part of the internal organ is to be examined under a high degree of magnification by using the optical system comprised of objective lens system 32, fiber optical viewing system 33 and eyepiece means 36. However, it is preferable to insert microscope 39 in the optical viewing instrument before inserting the instrument into the internal organ in order to insure speedy operation of microscope 39. After determining the part of the internal organ to be examined under a high degree of magnification, microscope 39 is manipulated from housing so that forward end surface 40a penetrates the internal organ as shown in FIGS. 1, 2 and 3. The examination under high magnification is effected by fiber optical system 40 (or parallel plane optical element 21 as in the case of FIG. 2 or 3), magnifying objective lens system 41, fiber optical viewing system 42 and eyepiece means 44.

During the examination under high magnification, illumination is usually provided by fiber optical illuminating system 34. However, if desired, additional illumination can be supplied to the part under examination by using the optical viewing system comprised of objective lens system 32 and fiber optical system 33. This is easily accomplished by replacing eyepiece means 36 by a light source; the light therefrom is transmitted through fiber optical system 33 and objective lens system 32 onto the part under examination.

Further, when examination by means of microscope 39 is not desired, sample gathering means such as forceps can be used in place of microscope 39 by removing microscope 39 from the optical viewing instrument and inserting the sample gathering means into guide tube 38 in the optical viewing instrument.

The performance of microscope 39 may be made the same as those of the embodiments shown in FIGS. 1, 2 and 3.

Further, a cylindrical or anamorphic lens system may be incorporated in microscope 39 in the same way as described hereinabove in connection with FIGS. 1, 2 and 3.

Thus far, the present invention has been described with reference to the preferred embodiments thereof as shown in several figures. It is clear to a person skilled in the art that the present invention provides a novel and useful microscope and an optical viewing instrument which has very small diameter and which can easily be inserted into an internal organ of a living body for directly observing or examining part of the internal organ under a high degree of magnification without need for excising a specimen from the internal organ for examination with a conventional microscope. The present invention can be used most advantageously in examination of the bronchia or the like of the human body.

It must be understood that the present invention is not limited to the detailed construction of the embodiments as shown in the drawings and described hereinabove, but that the present invention covers all the embodiments and modifications within the scope and spirit of the broad concept of the present invention as defined in the appended claims.

I claim:

1. A microscope adapted to be inserted into a living body for direct examination of interior surfaces thereof and having a magnifying objective lens system, a fiber optical viewing system for transmitting therethrough the image of the object focused on the forward end surface thereof by said magnifying objective lens system to the rear end surface of said fiber optical viewing system, eyepiece means for observing the magnified image formed on said rear end surface of said fiber optical viewing system, a fiber optical illuminating system for illuminating the object by the light transmitted from a light source through said fiber optical illuminating system to the front end surface thereof and onto said object, and open ended tube means covering the systems watertightly for protection against liquids encountered when the microscope is inserted in the living body, the improvement wherein optical means is provided in front of said magnifying objective lens system at the open end of said tube means in optical alignment therewith at an appropriate distance therefrom, the open end of said tube means and the forward end surface of said optical means being inclined in a common plane with respect to the plane normal to the optical axis of said objective lens system so that the inclined forward end surface of said optical means and the open end of the tube means flush therewith constitutes a needle which can easily penetrate a part of the body to be examined, said penetration being controlled by manipulating said microscope thereby permitting direct examination of the interior of the body without need for excising a specimen for examination.

2. A microscope according to claim 1, wherein said optical means is a fiber optical system, the image of the object contacting the inclined forward end surface thereof being transmitted to the rear end surface of said fiber optical system, the image transmitted to said rear end surface being focused on the forward end surface of said fiber optical viewing system at high degree of magnification by said magnifying objective lens system.

3. A microscope according to claim 1, wherein said optical means is a parallel plane optical element located in inclined relationship with respect to the plane normal to the optical axis of the magnifying objective lens system, the forward end surface of said fiber optical viewing system being inclined with respect to the plane normal to the optical axis of the magnifying objective lens system so that an optically conjugate relationship is formed between said parallel plane optical element and the thus inclined forward end surface of said viewing fiber optical system of the microscope.

4. A microscope according to claim 1, wherein said optical means is a parallel plane optical element located in inclined relationship with respect to the plane normal to the optical axis of the magnifying objective lens system, the forward end surface of said fiber optical viewing system of the microscope being inclined so as to be in parallel relationship to said parallel plane optical element.

5. A microscope according to claim 1, wherein said magnifying objective lens system comprises at least one lens element.

6. A microscope according to claim 1, wherein a cylindrical or anamorphic lens system is incorporated in the optical system of the microscope.

7. An optical viewing instrument adapted to be inserted into the space in a living body and having an objective lens system, a fiber optical viewing system for transmitting therethrough the image of the object focused on the forward end surface of said fiber optical viewing system by said objective lens system to the rear end surface of said fiber optical viewing system, eyepiece means for observing the image formed on said rear end surface of said fiber optical viewing system, fiber optical illuminating system for illuminating the object by the light transmitted therethrough from a light source to the forward end surface of said fiber optical illuminating system and projecting the light therefrom, and an outer tube covering the above mentioned elements watertightly for protection against liquids encountered when the optical viewing instrument is inserted in the living body, the improvement wherein a removable microscope is inserted through a guide tube extending within said outer tube so that the forward end of the microscope projects from the forward end of said outer tube, said microscope being provided with optical means located at the forward end of the microscope, a magnifying objective lens system, a fiber optical viewing system of the microscope for transmitting the magnified image focused on the forward end surface thereof by means of said magnifying objective lens system through said fiber optical viewing system of the microscope to the rear end surface thereof, eyepiece means of the microscope for observing the magnified image on said rear end surface of said fiber optical viewing system of the microscope, the forward end surface of said optical means being inclined with respect to the plane normal to the optical axis of said magnifying objective lens system so that said optical means can easily penetrate that part of the body into which said optical viewing instrument is to be inserted, the image of the object contacting the inclined forward end surface of said optical means being focused onto the forward end surface of said fiber optical viewing system by means of said magnifying objective lens system, the positioning any penetration of said forward end surface being controlled by manipulating said microscope while the object is being observed through the optical system of the optical viewing instrument.

8. An optical viewing instrument according to claim 7, wherein said optical means in the microscope is a fiber optical system, the image of the object contacting the inclined forward end surface of said fiber optical system being transmitted therethrough to the rear end surface thereof, the image thus transmitted to said rear end surface of said fiber optical system being focused on the front end surface of said fiber optical viewing system of the microscope at high degree of magnification.

9. An optical viewing instrument according to claim 7, wherein said optical means in the microscope is a parallel plane optical element located in inclined relationship with respect to the plane normal to the optical axis of the magnifying objective lens system, the forward end surface of said fiber optical viewing system of the microscope being inclined with respect to the plane normal to the optical axis of the magnifying objective lens system so that an optically conjugate relationship is given between said parallel plane optical element and the thus inclined forward end surface of said fiber optical viewing system of the microscope.

10. An optical viewing instrument according to claim 7, wherein said optical means in the microscope is a parallel plane optical element located in inclined relationship with respect to the plane normal to the optical axis of the magnifying objective lens system, the forward end surface of said fiber optical viewing system of the microscope being inclined so as to be in parallel relationship to said parallel plane optical element.

11. An optical viewing instrument according to claim 7, wherein means is provided in said outer tube for supplying dyeing or coloring agent to that part of the body to be examined.

12. An optical viewing instrument according to claim 7 wherein sample gathering means such as forceps can be used in place of said microscope.

13. An optical viewing instrument according to claim 7, wherein means is provided to connect the near end surface of the fiber optical viewing system of the viewing instrument to a light source in place of the eyepiece means thereby permitting additional illumination to be given to the object through said fiber optical viewing system of the viewing instrument in addition to the illumination by means of said fiber optical illuminating system when the microscope is used for examination of the object under a high degree of magnification.